May 17, 1949.    R. M. SHERWOOD ET AL    2,470,114
OPTICAL SOUND BEARING SYSTEM
Filed July 12, 1946    4 Sheets-Sheet 1

INVENTORS
ROBERT M. SHERWOOD
ROBERT J. URICK
LEO P. DELSASSO
BY
Attorney

May 17, 1949.　　　R. M. SHERWOOD ET AL　　　2,470,114
OPTICAL SOUND BEARING SYSTEM

Filed July 12, 1946.　　　　　　　　　　　　　　4 Sheets-Sheet 3

*INVENTORS*
ROBERT M. SHERWOOD
ROBERT J. URICK
LEO P. DELSASSO
BY
*M. C. Hayes*
Attorney May 17, 1949.　　R. M. SHERWOOD ET AL　　2,470,114
OPTICAL SOUND BEARING SYSTEM
Filed July 12, 1946　　4 Sheets-Sheet 4
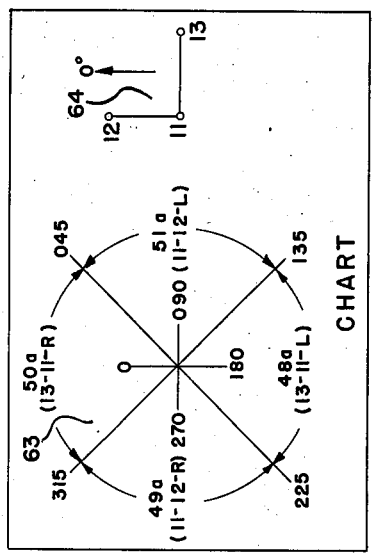
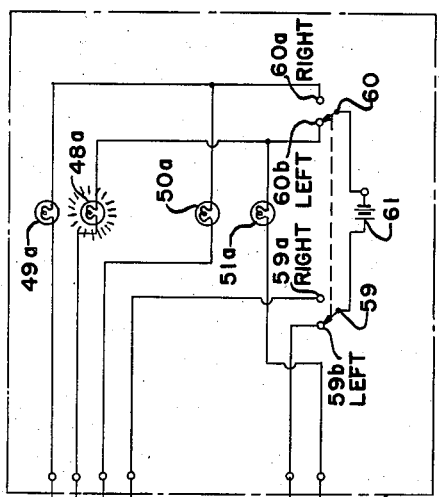
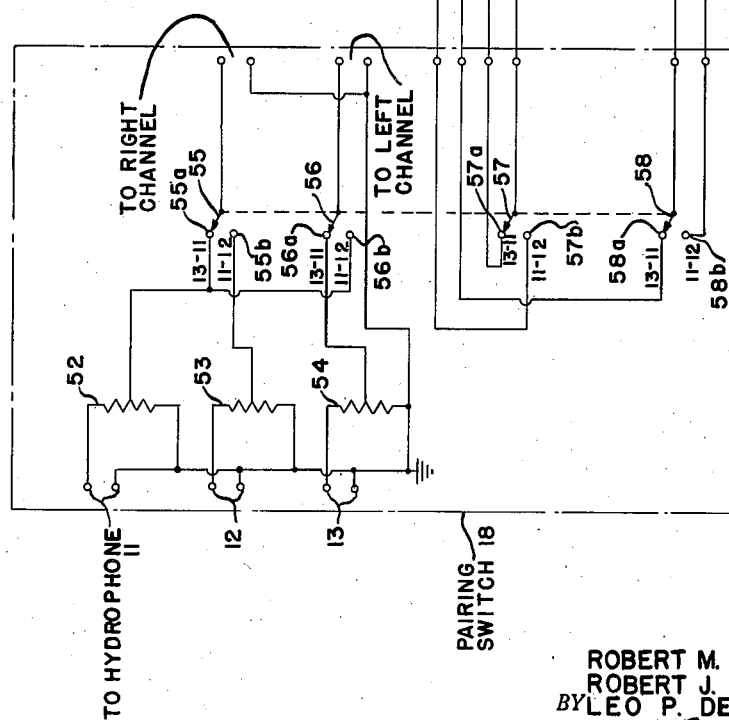
FIG. 10
FIG. 9
INVENTORS
ROBERT M. SHERWOOD
ROBERT J. URICK
BY LEO P. DELSASSO
ATTORNEY Patented May 17, 1949

2,470,114

UNITED STATES PATENT OFFICE 2,470,114

OPTICAL SOUND BEARING SYSTEM

Robert M. Sherwood and Robert J. Urick, San Diego, and Leo P. Delsasso, Los Angeles, Calif.

Application July 12, 1946, Serial No. 683,194

10 Claims. (Cl. 177—352)

(Granted under the act of March 3, 1883, as amended April 30, 1928; 370 O. G. 757)

This invention relates to equipment for observing the direction of sound impulses and more particularly to a system which measures the differences in time of arrival of a sound wave at separated points and provides an optical device for observing these differences.

In conventional binaural direction finding listening devices, sound picked up at two points is carried through separate channels to the ears of an observer. It is then possible by any of several means to adjust the mechanical or electrical paths or the physical orientation of the original pick-ups to make the sound appear to come from directly ahead of the observer. In such devices it is necessary to match the signals by ear and binaural sense on the part of the observer is required.

In the present system signals from two points are visually presented to the observer by cathode ray tubes. Electrical control is provided to enable the two signals to be compared or matched by eye to determine the direction from which the signals originate. The system consists of three hydrophones mounted underwater whose outputs are taken in alternate pairs by suitable switching means to separate amplifiers, filtered and finally impressed on two oscilloscope beams having a common sweep. The traces of these oscilloscope beams are made to appear superimposed by means of a semi-transparent mirror in one form of the invention. The observer adjusts the horizontal position of one trace relative to the other by means of a fine motion horizontal positioning control for one oscilloscope beam. When the left to right movement is such as to make the two traces match or coincide, the observer reads the bearing of the sound source from a dial calibrated directly in degrees.

A loud speaker with suitable amplifier is included in the system to permit simultaneous listening and observing. An automatic volume control amplifier maintains the vertical amplitude of the traces constant on the oscilloscope screens. An exceptionally large sweep amplitude is obtained by the use of an auxiliary sweep amplifier. Suitable provision is made for inserting into both oscilloscopes an identical sinusoidal voltage of known frequency for calibration purposes.

The group of three hydrophones may if desired be located on a submarine for measuring the curvature of the sound waves emanating from surface vessels and thus determining their bearing. By installing two groups of three hydrophones each, some distance apart it is possible to obtain the range as well as bearing of a sound source through a process of triangulation.

An object of this invention is to provide a direction finding listening device in which optical determination is possible.

Another object of this invention is to provide a simple switching means by which alternate pairs of hydrophones may be connected with optical measuring means.

Another object is to provide a system of indicator lights which indicate from which of several possible directions a signal is arriving. A further object is to provide a calibrated control which may be used in conjunction with an indicator switch to indicate quickly and accurately the direction of a sound.

The invention also resides in certain novel features of component structure and arrangement which facilitate the carrying out of the foregoing objects and which contribute both to the simplicity of the instrument and to the reliability of operation as well as to the ease and expeditious manner of making observations.

Other objects and advantages of the invention will become apparent from the following detailed description taken in connection with the accompanying drawings in which:

Figure 9 is a detailed schematic diagram of the pairing switch and test switch.

Figure 10 shows the chart which is used to interpret the observations.

Figure 1:
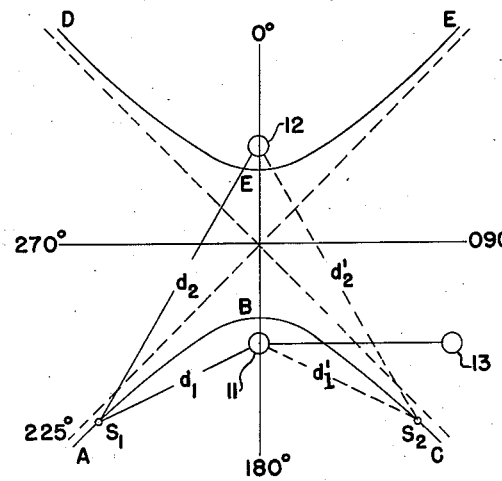
Figure 1 is a geometrical representation of the arrival of a sound signal at two of the three microphones.

While the invention is susceptible of various modifications and alternative arrangements, we have shown in the drawings and will herein describe in detail the preferred embodiment. It is to be understood, however, that we do not intend to limit the invention by such disclosure for we aim to cover all modifications and alternative arrangements falling within the spirit and scope of the invention as defined in the appended claims.

Figure 2:
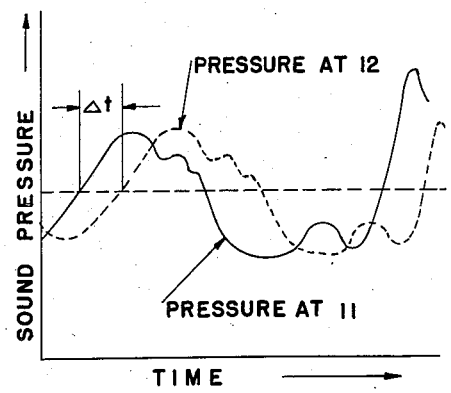
Figure 2 is a representation of the traces made by the pressure of a sound impulse at two hydrophones.

In Figure 1, the hydrophones 11 and 12 receive the same sound from source $S_1$ distant $d_1$ and $d_2$ feet respectively from them. Since, in general, $d_1$ and $d_2$ are not equal, the graph of sound pressure as a function of time at hydrophone 12 will be delayed in arrival by $$\Delta T = \frac{d_2' - d_1'}{c}$$

seconds, where $c$ is velocity of sound. This relation is represented in Figure 2.

As can be seen from Figure 1, there is another point $S_2$ for which $d_1$ equals $d_1'$ and $d_2'$ equals $d_2$ making $d_2' - d_1' = d_2 - d_1$. In fact, a given time difference $\Delta T$ fixes an entire branch ABC of a hyperbola as known from analytic geometry. If the sound wave reaches hydrophone 12 first the branch DEF is obtained.

Figure 3:
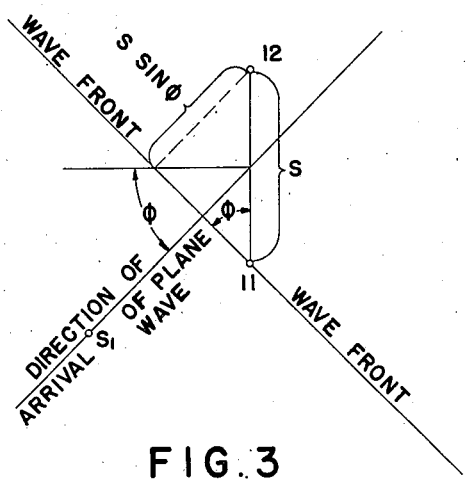
Figure 3 shows the angle of arrival of waves from the sound source.

When the hydrophone separation is of the order of 5 feet, a point on the hyperbola is distant from the asymptote by 1 degree or less (measured at the origin) when the point is 9 feet or more from the origin. Thus, for all practical purposes the direction of a source is given by the asymptote. This is the equivalent of a source at a great distance yielding plane waves at the hydrophones. Figure 3 shows these effective plane waves arriving at an angle $\phi$ measured from the perpendicular bisector of the line joining hydrophones 11 and 12. The distance perpendicular to the wave front that the wave travels from 11 to 12 is $S \sin \phi$, where $S$ equals the separation of 11 and 12. This is the difference in path $d_2 - d_1$ above. We then have $$\Delta T = \frac{d_2 - d_1}{c} = \frac{S \sin \phi}{c} \text{ (constant } \sin \phi\text{)}$$

Thus a device which measures the time between the arrival of a sound at hydrophone 11 and its arrival at hydrophone 12 may be calibrated to read the angle $\phi$ from which it arrives. Should the source be on branch DEF it would be necessary to retard the signal from 12 to make it identical in time with that from 11. Measurement of the retardation would likewise give the angle from which a sound arrives.

Figure 4:
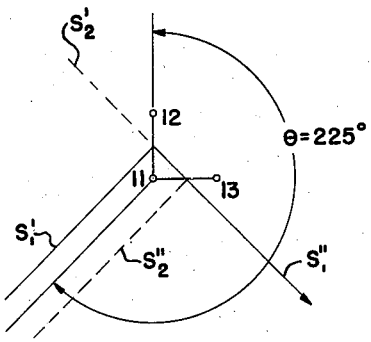
Figure 4 shows a comparison of signal representation to eliminate ambiguity of direction.

As mentioned above there are two directions symmetrical with respect to the line connecting the hydrophones 11 and 12 determined by a given $\Delta T$. This ambiguity of direction can be eliminated by the use of auxiliary hydrophone 13. Comparison of the signals from 11 and 12 in Fig. 4 determines the solid line pair of asymptotes $S_1'$ and $S_1''$. A similar comparison of signals from 11 and 13 yields the dash line pair of asymptotes $S_2'$ and $S_2''$. The correct bearing of the signal is $\theta$ since it appears as a possibility with both pairs of hydrophones. $\theta$ is a bearing angle measured from the relative zero line along the line of hydrophones 11 and 12. With a hydrophone separation on the order of 5 feet the maximum bearing error caused by having different origins for reading with the 11—12 pair and the 13—11 pair is less than 1° for any source more than 35 yards from the hydrophone group.

Any desired type of hydrophone may be used but a suitable one is of rubber encased contact type which is designed primarily for overside listening service on shipboard. The most important electrical requirement of hydrophones for use in this system is that the phase of their output voltages, delivered to the amplifiers, be identical for an in-phase sound pressure input to both of them, at least taken on an average over a frequency range of 1 octave. There may be any constant phase shift between the sound pressure and the electrical output of any one hydrophone provided it is the same for all hydrophones. Minor variations from the optimum identical output phase condition are permissible if they average out over the octane range of frequencies passed by the filters. Hydrophones having a substantial phase and amplitude similarity over the octave 500 to 1000 cycles per second are most suitable.

Figure 5:
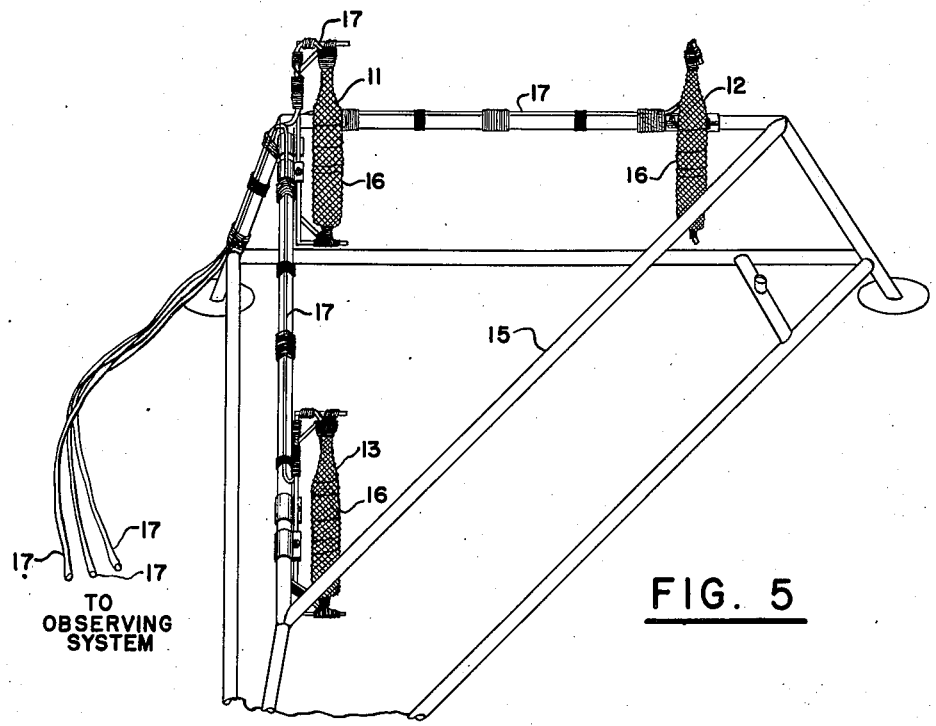
Figure 5 is a perspective view of the tripod support for the hydrophones.

The hydrophones as shown in Figure 5 are mounted on a triangular frame 15 in cylinders of cord netting 16 which afford an equal distribution of pressure. The tripod support is set on the sea bottom or it may be mounted on the deck of a submarine. The frame maintains the hydrophones at the corners of a right isoceles triangle.

Figure 6:
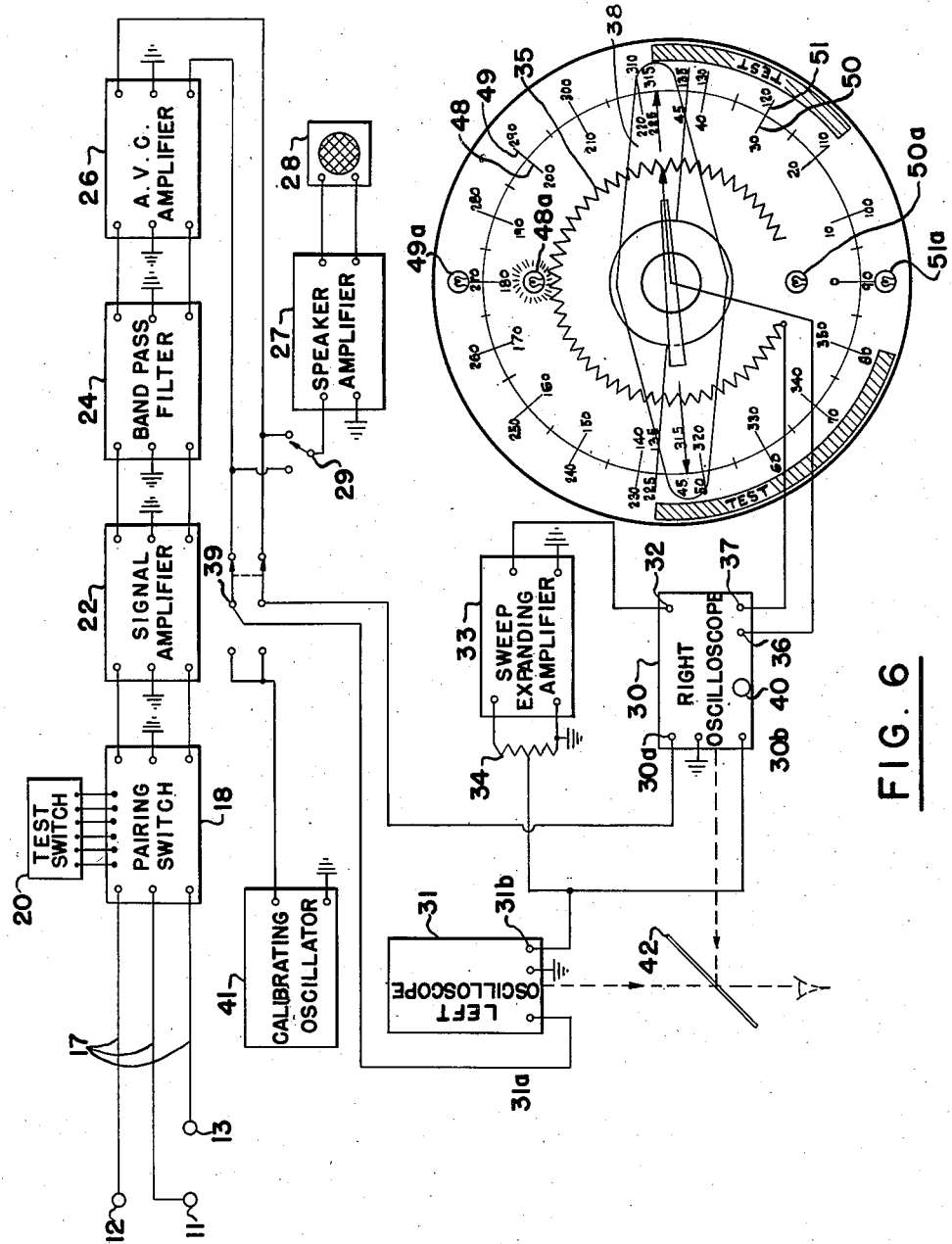
Figure 6 is a block diagram of the various components of the system.

A suitable inter-hydrophone distance is 59½ inches, this being the distance travelled by sound in sea water at 17° centigrade in one millisecond. This spacing avoids the confusion of sound which would be possible with a shorter spacing. It also is not subject to the disadvantages of a greater spacing in which changes of wave shape in traveling a greater distance would deteriorate the matches. Cables 17 as shown in Figure 6 connect the hydrophones with the observing system which is located at a suitable point on shore or aboard the vessel. The outputs of the three hydrophones are led to a pairing switch permitting the selection by the operator of two of them for observation. Hydrophone 11 which lies at the right angle corner of the isosceles triangle set-up may be paired with either of the other two. Test switch 20 is used in determining the quadrant of the signal.

The voltages obtained from the two hydrophones selected by the pairing switch are amplified by signal amplifier 22. The two channels of the amplifier should be identical as to phase response to avoid relative phase shift which would cause the bearing obtained to be erroneous. Phase identity is not difficult to achieve, however, since only a desired range of frequencies is passed by the band-pass filter 24. Suitable adjusting means for differences in amplitude intensity are provided in the amplifiers.

The band-pass filters restrict the observed frequencies to a single octave. 500 to 1000 cycles per second filters are satisfactory. With this range, difficulties due to dissimilarity of amplitude and phase between any two hydrophones are minimized and a simpler form of wave is observed on the oscilloscope screen. The disadvantages of too narrow a band in which the waves would have little individuality or character and make identification difficult are avoided by the use of a 500 to 1000 cycles per second filter. Automatic volume control amplifier 26 avoids too large an increase of sound energy as might be the case when a fast moving vessel passes near the hydrophones. The amplifier should give only a small increase in output for a relatively large increase of input.

An amplifier 27 and a speaker 28 are provided to relieve the operator from the necessity of constant visual observing. Switch 29 connects this equipment when desired. An oscilloscope 30 is connected to one of the amplifying channels which will be designated as the right channel. A second oscilloscope 31 is connected to the other channel which will be designated as the left channel.

The sweep generator of the right oscilloscope 30 is connected through terminal 32 to the sweep expanding amplifier 33. Sweep amplitude control is provided by potentiometer 34 which is connected across the output of the sweep expanding amplifier. This output goes to the horizontal-amplifier terminals 30b and 31b of the oscilloscopes. An effective sweep amplitude of approximately 13 feet has been found satisfactory in spreading the waves on the screen out far enough for convenient and accurate observation. With a larger sweep amplitude than this, the traces may become too dim; with a smaller amplitude the crowding of the waves on the screen is undesirable.

A fine motion horizontal positioning control is provided by potentiometer 35 connected in series with the regular horizontal positioning control of the right oscilloscope through connections 36 and 37 from the horizontal positioning circuit. A double ended pointer 38 which moves over a dial calibrated directly in degrees of bearing is connected to the adjusting arm of the potentiometer.

The sweep frequency of the common sweep oscillator is adjustable by means of the regular horizontal frequency control 40 of the right oscilloscope. A sweep frequency of seven cycles per second is satisfactory. With a much higher frequency than this multiple traces become evident; with a lower frequency excessive flicker of the trace is apt to occur.

It is apparent that with this large effective sweep amplitude of 13 feet and for instance a 5 inch cathode ray tube, the total sound output of the source and hydrophones will be observed during only a very small part $$\left(\frac{5}{13 \times 12} \text{ or about } 3\%\right)$$

of the time. Both sweep amplitude and sweep frequency determine how far apart on the screen waves of any given frequency occur to the observer, for the velocity of the spot is equal to the product of sweep amplitude and frequency, neglecting the short time duration of the return trace.

Figure 7:
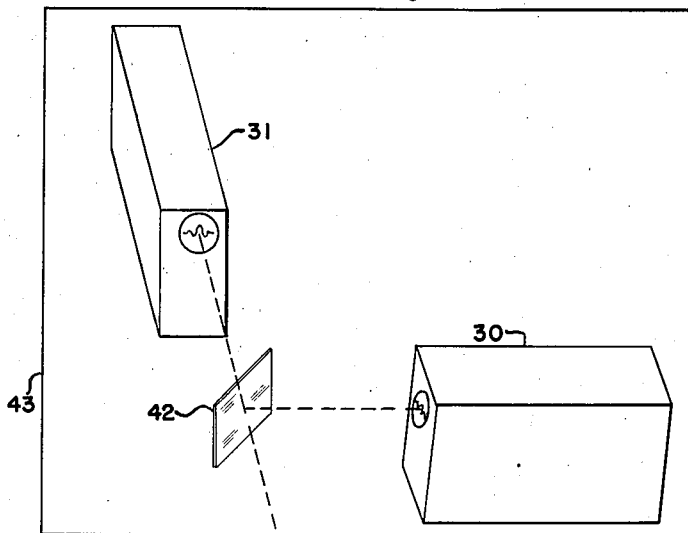
Figure 7 is a perspective view of the oscilloscopes and viewing means.

Figure 7 shows the arrangement of the oscilloscopes and transparent mirror. The oscilloscopes are arranged along the sides of an L at right angles. They face toward the intersection of the L and are equidistant from it in order to avoid parallax effects. A half-silvered semi-transparent mirror 42 at the intersection permits direct transmission as well as reflection of light from the oscilloscope screens. The oscilloscopes and mirror are located in a light tight box 43 in such a manner that a view through the observation window 44 gives a direct sight of the oscilloscope of the trace on oscilloscope 31 and a reflected view of the trace on oscilloscope 30. Because of the left to right reversal of the image of the reflected screen the connections to the horizontal deflecting plates of the oscilloscope seen through the mirror are transposed, in order that the direction of motion seen through the observation window will be the same for both oscilloscopes.

Figure 8:
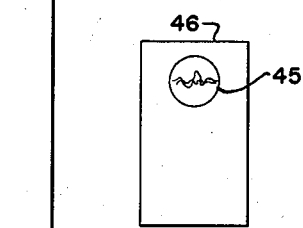
Figure 8 is an elevation view of a dual oscilloscope.

A double oscilloscope having a cathode ray tube with two separately controllable electron streams may be employed in place of the separate oscilloscopes whose trace images are superimposed by the half-silvered mirror 42, the superposition of the traces being accomplished within a multiple trace oscilloscope according to well known constructions for two-gun oscilloscopes. Traces from these two streams are shown in observation window 45 of dual oscilloscope 46 in Figure 8. A further alternative is the use of an electronic switch for changing over rapidly from one signal to another on a single oscilloscope. A switching frequency of 10 kilocycles or more is necessary as well as reduction of switching transients. Traces in such an arrangement would appear similar to those in Figure 8.

The proposed system determines bearings by measuring the apparent travel time of a sound wave between two hydrophones a known fixed distance apart. These small time differences are converted into differences of distance by the sweep action of the oscilloscopes and an observer viewing the screens sees the two waves offset relative to each other by certain amounts. The magnitude of this offset depends upon the speed with which the cathode ray spot travels across the screen. The greater the sweep speed the greater the offset distance for the same time difference, and conversely. Therefore, in order that a given offset distance may be made to mean something in terms of time, the sweep speed must be known. Similarly the use of a dial reading bearing in degrees is valid for only a single sweep velocity. The sweep amplitude and frequency or either must therefore be adjusted so that the spot moves a constant known distance in a given time interval, for instance, one millisecond. This distance may be made evident by placing a 1000 cycle per second sine wave on the oscilloscope screen.

Since the hydrophones have been placed on their mounting at a distance apart of 59½ inches the maximum travel time of sound between them is just 1 millisecond. This corresponds to a bearing of 90° when 0 degrees is taken as the direction perpendicular to the line of two hydrophones. Therefore, when the equipment is calibrated, movement of the main bearing dial, which controls the horizontal positioning of one oscilloscope, from the center position to full rotation on either side should displace a 1000 cycle per second wave by one wave length. By means of switch 39, the hydrophone signals may be replaced by a 1000 cycle per second sinusoidal voltage obtained from an oscillator 41. The individual horizontal gain and coarse horizontal positioning controls of the oscilloscopes are adjusted to equality for this wave source. The operator then adjusts the common sweep amplitude control until movement of the bearing dial from the center position to full rotation on the left or right results in a one wave length displacement of a wave trace on one oscilloscope relative to the trace on the other oscilloscope. This will calibrate the equipment and provide that the bearing dial will read degrees of bearing correctly.

Each position of the bearing pointer 38 corresponds in general to four distinct bearings. Two of the scales 48 and 49 are placed on the upper half of the dial and scales 50 and 51 are placed on the lower, in such a way that the bearing numbers increase from left to right. There is a zone of rotation for the pointer beyond 90° to the left or right of the center position which is used for testing to remove the directional ambiguity inherent in the use of two hydrophones.

Selection of a particular one of the four bearing scales depends upon which pair of the 3 hydrophones is being employed for observation and the sense of the indication of the other pair. That is, which one of the two is leading (in time of receiving the signal) and which one is lagging. This selection is facilitated by the indicator lights.

As shown in Fig. 9, the hydrophone outputs are equalized by the amplitude adjustment controls 52, 53 and 54. The pairing switch consists of four gang connected double throw switches 55, 56, 57 and 58. Switch 55 is connected to the right channel and 56 is connected to the left channel. Contact point 55a is connected to hydrophone 11 as is contact point 56b. Contact 55b is connected to hydrophone 12 and contact point 56a is connected to hydrophone 13. Switch 57 is connected to contact point 59a in the test switch and switch 58 is connected to contact point 59b. Contact point 57a connects to lamp 50a. Contact point 57b is connected to indicator lamp 49a. Point 58a is connected to lamp 48a. Point 58b is connected to 51a. The other sides of lamps 48a and 51a are connected to contact point 60b. The other sides of lamps 49a and 50a are connected to contact point 60a. The switches 59 and 60 are connected together for gang operation and are each connected to one side of a source of potential 61. A standby position between the contact points is provided for these switches.

The circular chart 63 as shown in Figure 10 indicates the quadrant in which the bearing should be read when a certain indicator lamp is illuminated. The hydrophone arrangement 64 shown in Figure 10 illustrates the relative bearing direction.

The operation of the device will be described for determining the direction of a sound source located at $S_1$ in Figure 1 which is 225° relative to the lay-out of the equipment. The equipment is turned on and the pairing switch is set on hydrophones 13 and 11. Hydrophone 13 is connected to the left channel and 11 to the right channel. Due to the gang connection of switches 55 to 58, switches 57 and 58 close the breaks in the circuits to lamps 50A and 48A.

As the signals from source $S_1$ strike hydrophone 11 first, the horizontal positioning pointer is turned to the right end of the top scales in order to retard the trace resulting from reception of the signal at 11 and bring it into coincidence with the trace from hydrophone 13. Since the pointer of the bearing knob is not over a test region, the pairing switch should be thrown to the other or 11—12 position. In this case, a match is found at the edge of the left-hand test region because hydrophone 11 which receives the signals from source $S_1$ first, is connected to the left channel. Accordingly, the control knob for the right channel which is connected to hydrophone 12 must be turned to the left in order to advance the trace of the signal received by hydrophone 12 to make it coincide with that from hydrophone 11.

The test switches 59 and 60 which have been in the stand-by region are now thrown to the left or "b" position because that is the region in which a test match has been found. This connects the current source to indicator light 48A and 51A as well as to switch 58. The pairing switch is then thrown back to the 13—11 position for reading the bearing. This closes the circuit to switch point 58A and illuminates lamp 48A. The bearing is read at the right end of scale 48 in view of indicator lamp 48A being illuminated. The corresponding scale reading is 225°. The operations have selected the two scales which apply to sense matches on the left and have further selected the one of these two which should be used in reading the bearings.

If desired, a similar set of hydrophones may be located a substantial distance (in the order of 2,000 or 3,000 yards) from the first set of hydrophones and leads taken to an observing system. By determining the intersection of the lines of bearing from this second set of hydrophones and the first set, the range as well as the bearing of a sound source may be determined by the use of triangulation.

The invention described herein may be manufactured and used by or for the Government of the United States for governmental purposes without the payment to us of any royalties thereon or therefor.

What is claimed is:

1. An impulse direction determining system comprising three energy pick-ups arranged at the apices of a right isosceles triangle, means for selecting alternative pairs of pick-ups in accordance with the direction of energy impulses received thereby, and optical means for determining the difference in time of arrival of an impulse at the selected pair of pick-ups.

2. A wave source direction finder comprising three wave receivers arranged at the apices of a right isosceles triangle, means for selecting a pair of receivers in accordance with the quadrant of direction of travel of the waves received thereby, a cathode ray tube device providing two controlled electron streams, a circuit for controlling each of these streams in accordance with the output from one of the receivers of said selected pair, means for superimposing the traces of the streams, a controller for moving one trace relative to the other and means for measuring the amount of movement, whereby the direction of travel of waves in each quadrant is determined.

3. An impulse direction indicator comprising three impulse receivers arranged at the apices of a right isosceles triangle, a pair of amplifying channels, a switch for connecting the receivers in alternate pairs to the channels, each pair defining one side of the right angle, a cathode ray tube device providing two electron ray streams each of which is controlled by one of the amplifying channels and means for superimposing the traces of the streams.

4. An impulse direction finder comprising three impulse receivers arranged at the apices of a right isosceles triangle, a pair of amplifying channels, a switch for connecting the receiver at the right angle apex to either of the channels, and alternately connecting one of the remaining receivers to the remaining channel, a cathode ray device providing two electron ray streams each of which is controlled by one of the amplifying channels and means for superimposing the traces of the streams.

5. In an impulse direction finder having three impulse receivers arranged at the apices of a right isosceles triangle and a pair of amplifying channels, a two position switch, one position connecting the receiver at the right angle apex to the first channel and a second receiver to the second channel, the second position connecting the right angle receiver to the second channel and the third receiver to the first channel.

6. An impulse direction observing system comprising three impulse receivers arranged at the apices of a right isosceles triangle, four indicators, a pair of amplifying channels, a two position switch, one position connecting a voltage source to a pair of indicators, the second position connecting the source to the other pair of indicators, a second two position switch, one position connecting the receiver at the right angled apex to the first channel and a second receiver to the second channel as well as closing breaks in the circuits of one indicator from each pair, the other position connecting the right angled receiver to the second channel and the third receiver to the first channel as well as closing breaks in the circuits of the remaining two indicators.

7. A signal time arrival measuring system comprising a pair of cathode ray tubes arranged along the sides of an L and facing its intersection, a semitransparent mirror bisecting the angle of intersection, the trace on one tube being reflected from the mirror and the other tube trace being visible through the mirror in superimposed relation to the first, the direction of development of the traces being opposite, a horizontal positioning control for one of the traces calibrated so that its approximate mid-position matches traces from wave signals fed into the tubes at identical times, a relative displacement of one wave length being obtainable by movement of the control in either direction, the controller retarding the trace of signals received first through its associated tube by movement in one direction until the traces substantialy coincide, and advancing signals received first by the other tube by movement in the other direction, the displacement of the controller indicating the difference in time of signal arrival.

8. An impulse direction observing system comprising three impulse receivers arranged at the apices of a right isosceles triangle, a pair of amplifying channels, a cathode ray tracing device connected to each of the channels, means for superimposing the traces, a controller for moving one trace relative to the other lengthwise of the traces, one position of the controller bringing traces having the same time origin into coincidence, four indicators, a voltage source, a two position switch, one position connecting the voltage source to a pair of indicators, the other position connecting the source to the other pair of indicators, a second two position switch, one position connecting the receiver at the right angled apex to the first channel and a second receiver to the second channel, as well as closing breaks in the circuits of one indicator from each pair, the other position connecting the right angle receiver to the second channel and the remaining receiver to the first channel, as well as closing breaks in the circuits of the remaining two indicators, the position of the controller necessary to bring the traces into coincidence and the connected indicator showing the angle from which an impulse strikes the receiver due to measurement of the difference in time of arrival of the impulse at a selected pair of receivers.

9. The direction indicator of claim 3 having filter means in each of said amplifying channels for limiting the response thereof substantially to frequencies within a selected octave.

10. The direction indicator of claim 3 having a band-pass filter and automatic volume control means in each of said amplifying channels for limiting the response to signals having frequencies within a selected octave and for equalizing and controlling the amplitudes of the amplified signals in the channels.

ROBERT M. SHERWOOD.
ROBERT J. URICK.
LEO P. DELSASSO.

REFERENCES CITED

The following references are of record in the file of this patent:

UNITED STATES PATENTS

| Number | Name | Date |
|---|---|---|
| 2,209,191 | Dearing | July 23, 1940 |
| 2,284,771 | Schak | June 2, 1942 |
| 2,304,965 | Sproule | Dec. 15, 1942 |
| 2,349,370 | Orner | May 23, 1944 |
| 2,350,080 | Spoule | May 30, 1944 |
| 2,397,746 | Lewis | Apr. 2, 1946 |
| 2,399,017 | Goldman | Apr. 23, 1946 |
| 2,403,974 | Goodale et al. | July 16, 1946 |
| 2,406,014 | Harry | Aug. 20, 1946 |
| 2,411,071 | Wade | Nov. 12, 1946 |
| 2,434,278 | Mason | Jan. 13, 1948 |

FOREIGN PATENTS

| Number | Country | Date |
|---|---|---|
| 490,322 | Great Britain | May 25, 1937 |